United States Patent
Bridges et al.

(10) Patent No.: US 7,568,070 B2
(45) Date of Patent: Jul. 28, 2009

(54) INSTRUCTION CACHE HAVING FIXED NUMBER OF VARIABLE LENGTH INSTRUCTIONS

(75) Inventors: Jeffrey Todd Bridges, Raleigh, NC (US); James Norris Dieffenderfer, Apex, NC (US); Rodney Wayne Smith, Raleigh, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 425 days.

(21) Appl. No.: 11/193,547

(22) Filed: Jul. 29, 2005

(65) Prior Publication Data

US 2007/0028050 A1   Feb. 1, 2007

(51) Int. Cl.
*G06F 9/34* (2006.01)
(52) U.S. Cl. .................... 711/125; 712/204
(58) Field of Classification Search .............. 711/125; 712/204
See application file for complete search history.

(56) References Cited

U.S. PATENT DOCUMENTS

| | | | |
|---|---|---|---|
| 5,179,680 A * | 1/1993 | Colwell et al. ............ 711/125 |
| 5,488,710 A * | 1/1996 | Sato et al. ............... 711/125 |
| 6,035,387 A | 3/2000 | Hsu et al. |
| 6,253,287 B1 | 6/2001 | Green |
| 6,253,309 B1 | 6/2001 | Mahalingaiah |
| 6,530,013 B1 * | 3/2003 | Hara et al. ............... 712/206 |
| 6,779,100 B1 * | 8/2004 | Keltcher et al. ............ 711/202 |

FOREIGN PATENT DOCUMENTS

WO   0127749   4/2001

* cited by examiner

*Primary Examiner*—Kevin L Ellis
*Assistant Examiner*—Jared I Rutz
(74) *Attorney, Agent, or Firm*—Nicholas J. Pauley; Peter Kamarchik; Joseph Agusta

(57) ABSTRACT

A fixed number of variable-length instructions are stored in each line of an instruction cache. The variable-length instructions are aligned along predetermined boundaries. Since the length of each instruction in the line, and hence the span of memory the instructions occupy, is not known, the address of the next following instruction is calculated and stored with the cache line. Ascertaining the instruction boundaries, aligning the instructions, and calculating the next fetch address are performed in a predecoder prior to placing the instructions in the cache.

20 Claims, 3 Drawing Sheets

INSTRUCTION CACHE HAVING FIXED NUMBER OF VARIABLE LENGTH INSTRUCTIONS

BACKGROUND

The present invention relates generally to the field of processors and in particular to a processor having an instruction cache storing a fixed number of variable length instructions.

Microprocessors perform computational tasks in a wide variety of applications, including portable electronic devices. In many cases, maximizing processor performance is a major design goal, to permit additional functions and features to be implemented in portable electronic devices and other applications. Additionally, power consumption is of particular concern in portable electronic devices, which have limited battery capacity. Hence, processor designs that increase performance and reduce power consumption are desirable.

Most modern processors employ one or more instruction execution pipelines, wherein the execution of many multi-step sequential instructions is overlapped to improve overall processor performance. Capitalizing on the spatial and temporal locality properties of most programs, recently executed instructions are stored in a cache—a high-speed, usually on-chip memory—for ready access by the execution pipeline.

Many processor Instruction Set Architectures (ISA) include variable length instructions. That is, the instruction op codes read from memory do not all occupy the same amount of space. This may result from the inclusion of operands with arithmetic or logical instructions, the amalgamation of multiple operations into a Very Long Instruction Word (VLIW), or other architectural features. One disadvantage to variable length instructions is that, upon fetching instructions from an instruction cache, the processor must ascertain the boundaries of each instruction, a computational task that consumes power and reduces performance.

One approach known in the art to improving instruction cache access in the presence of variable length instructions is to "pre-decode" the instructions prior to storing them in the cache, and additionally store some instruction boundary information in the cache line along with the instructions. This reduces, but does not eliminate, the additional computational burden of ascertaining instruction boundaries that is placed on the decode task.

Also, by packing instructions into the cache in the same compact form that they are read from memory, instructions are occasionally misaligned, with part of an instruction being stored at the end of one cache line and the remainder stored at the beginning of a successive cache line. Fetching this instruction requires two cache accesses, further reducing performance and increasing power consumption, particularly as the two accesses are required each time the instruction executes.

FIG. 1 depicts a representative diagram of two lines 100, 140 of a prior art instruction cache storing variable length instructions (I1-I9). In this representative example, each cache line comprises sixteen bytes, and a 32-bit word size is assumed. Most instructions are a word width, or four bytes. Some instructions are of half-word width, comprising two bytes. A first cache line 100 and associated tag field 120 contain instructions I1 through I4, and half of instruction I5. A second cache line 140, with associated tag field 160, contains the second half of instruction I5, and instructions I6 through I9. The instruction lengths and their address are summarized in the following table:

TABLE 1

Variable Length Instructions in Prior Art Cache

| Instruction | Size | Address | Alignment |
|---|---|---|---|
| I1 | word | 0x1A0 | aligned on word boundary |
| I2 | word | 0x1A4 | aligned on word boundary |
| I3 | halfword | 0x1A8 | aligned on word boundary |
| I4 | word | 0x1AA | misaligned across word boundaries |
| I5 | word | 0x1AE | misaligned across cache lines |
| I6 | word | 0x1B2 | misaligned across word boundaries |
| I7 | word | 0x1B6 | misaligned across word boundaries |
| I8 | halfword | 0x1BA | not aligned on word boundary |
| I9 | word | 0x1BC | aligned on word boundary |

To read these instructions from the cache lines 100, 140, the processor must expend additional computational effort—at the cost of power consumption and delay—to determine the instruction boundaries. While this task may be assisted by pre-decoding the instructions and storing boundary information in or associated with the cache lines 100, 140, the additional computation is not obviated. Additionally, a fetch of instruction I5 will require two cache accesses. This dual access to fetch a misaligned instruction from the cache causes additional power consumption and processor delay.

SUMMARY

A fixed number of variable-length instructions are stored in each line of an instruction cache. The variable-length instructions are aligned along predetermined boundaries. Since the length of each instruction in the line, and hence the span of memory the instructions occupy, is not known, the address of the next following instruction is calculated and stored with the cache line. Ascertaining the instruction boundaries, aligning the instructions, and calculating the next fetch address are performed in a predecoder prior to placing the instructions in the cache.

In one embodiment, a method of cache management in a processor having variable instruction length comprises storing a fixed number of instructions per cache line.

In another embodiment, a processor includes an instruction execution pipeline operative to execute instructions of variable length and an instruction cache operative to store a fixed number of the variable length instructions per cache line. The processor additionally includes a predecoder operative to align the variable length instructions along predetermined boundaries prior to writing the instructions into a cache line.

DETAILED DESCRIPTION

Figure 2:
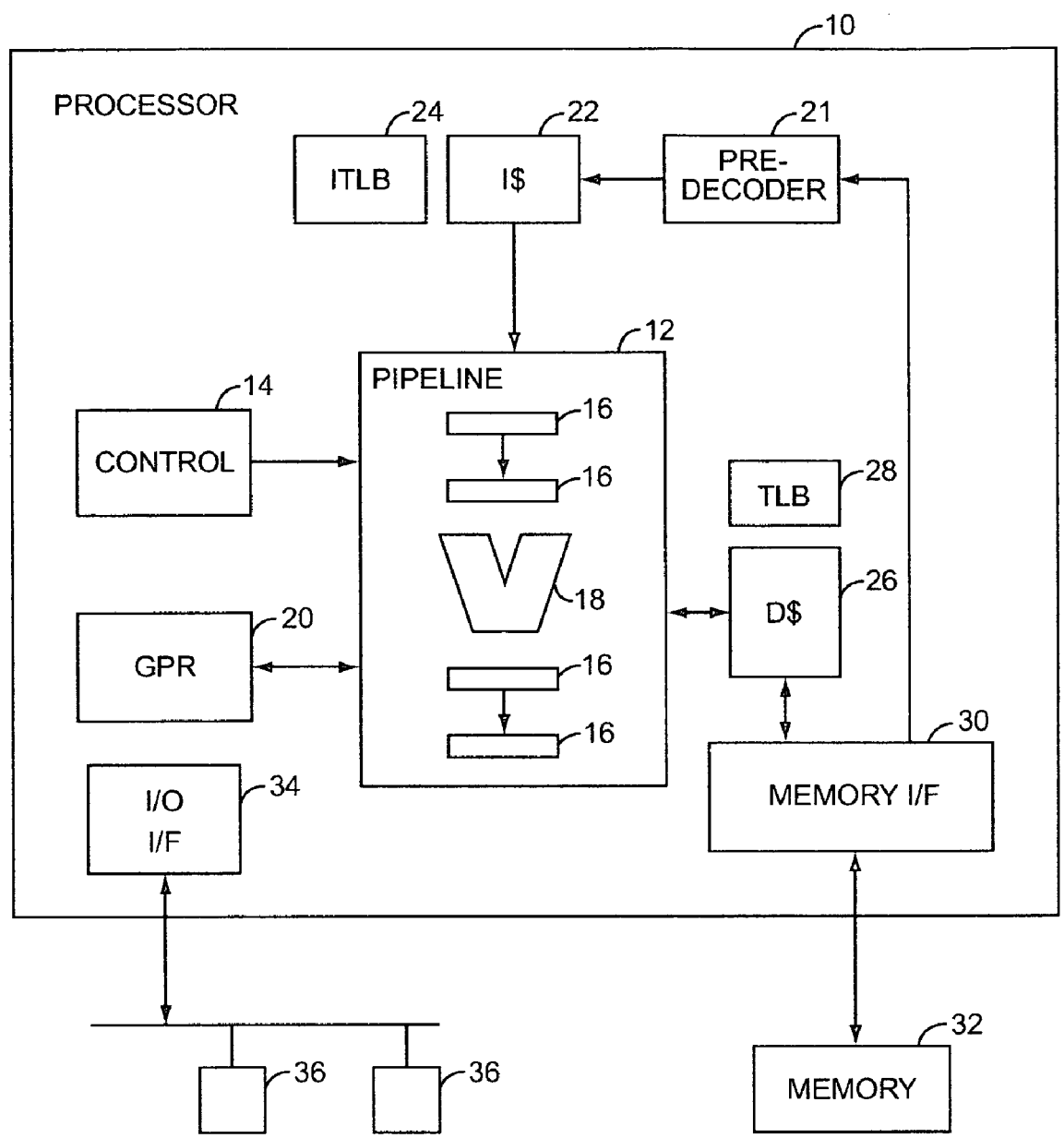
FIG. 2 is a functional block diagram of a processor.

FIG. 2 depicts a functional block diagram of a representative processor 10, employing both a pipelined architecture and a hierarchical memory structure. The processor 10 executes instructions in an instruction execution pipeline 12 according to control logic 14. The pipeline includes various registers or latches 16, organized in pipe stages, and one or more Arithmetic Logic Units (ALU) 18. A General Purpose Register (GPR) file 20 provides registers comprising the top of the memory hierarchy.

The pipeline fetches instructions from an Instruction Cache (I-cache) 22, with memory addressing and permissions managed by an Instruction-side Translation Lookaside Buffer (ITLB) 24. A pre-decoder 21 inspects instructions fetched from memory prior to storing them in the I-cache 22. As discussed below, the pre-decoder 21 ascertains instruction boundaries, aligns the instructions, and calculates a next fetch address, which is store in the I-cache 22 with the instructions.

Data is accessed from a Data Cache 26, with memory addressing and permissions managed by a main Translation Lookaside Buffer (TLB) 28. In various embodiments, the ITLB 24 may comprise a copy of part of the TLB 28. Alternatively, the ITLB 24 and TLB 28 may be integrated. Similarly, in various embodiments of the processor 10, the I-cache 22 and D-cache 26 may be integrated, or unified. Misses in the I-cache 22 and/or the D-cache 26 cause an access to main (off-chip) memory 32, under the control of a memory interface 30.

The processor 10 may include an Input/Output (I/O) interface 34, controlling access to various peripheral devices 36. Those of skill in the art will recognize that numerous variations of the processor 10 are possible. For example, the processor 10 may include a second-level (L2) cache for either or both the I and D caches 22, 26. In addition, one or more of the functional blocks depicted in the processor 10 may be omitted from a particular embodiment.

According to one or more embodiments disclosed herein, the processor 10 stores a fixed number of variable length instructions in each cache line. The instructions are preferably aligned along predetermined boundaries, such as for example word boundaries. This alleviates the decode pipe stage from the necessity of calculating instruction boundaries, allowing higher speed operation and thus improving processor performance. Storing instructions this way in the I-cache 22 also reduces power consumption by performing instruction length detection and alignment operation once. As I-cache 22 hit rates are commonly in the high 90%, considerable power savings may be realized by eliminating the need to ascertain instruction boundaries every time an instruction is executed from the I-cache 22.

The pre-decoder 21 comprises logic interposed in the path between main memory 32 and the I-cache 22. The pre-decoder 21 logic inspects the data retrieved from memory, and ascertains the number and length of instructions. The pre-decoder aligns the instructions along predetermined, e.g., word, boundaries, prior to passing the aligned instructions to the cache to be stored in a cache line.

Figure 1:
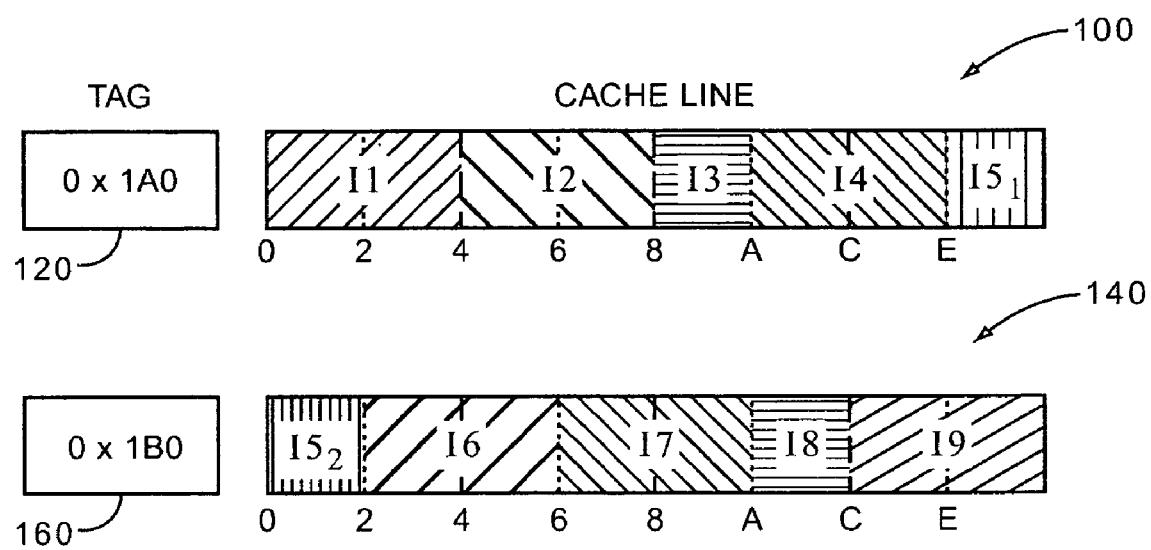
FIG. 1 is a diagram of a prior art instruction cache storing variable length instructions.
Figure 3:
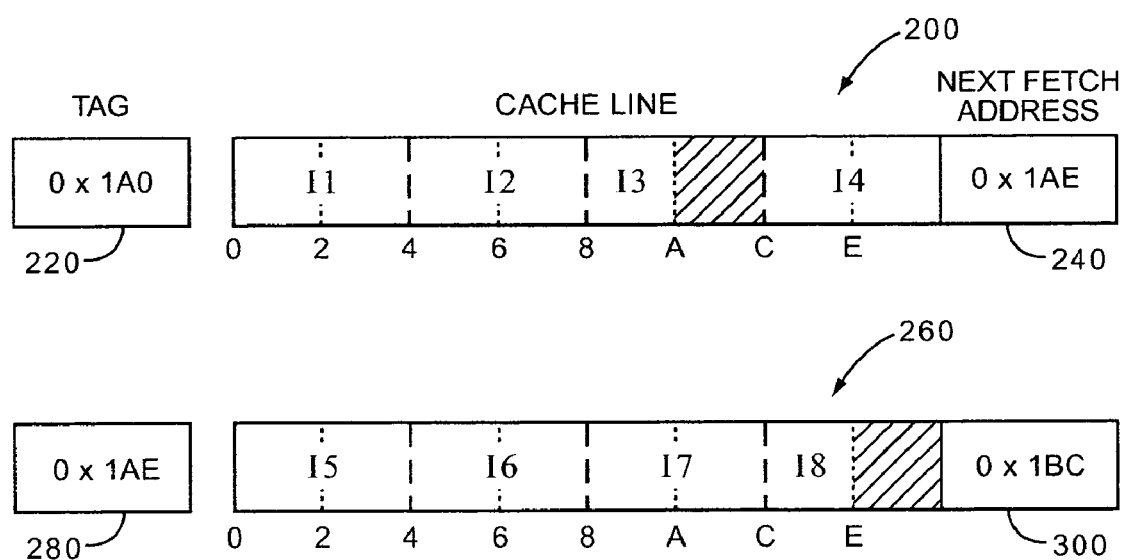
FIG. 3 is a diagram of an instruction cache storing a fixed number of variable length instructions, aligned along predetermined boundaries.

FIG. 3 depicts two representative lines 200, 260 of the I-cache 22, each containing a fixed number of the variable length instructions from FIG. 1 (in this example, four instructions are stored in each cache line 200, 260). The cache lines 200, 260 are 16 bytes. Word boundaries are indicated by dashed lines; halfword boundaries are indicated by dotted lines. The instructions are aligned along word boundaries (i.e., each instruction starts at a word address). When an instruction is fetched from the I-cache 22 by the pipeline 12, the decode pipe stage may simply multiplex the relevant word from the cache line 200, 260 and immediately begin decoding the op code. In the case of half-word instructions (e.g., I3 and I8), one half-word of space in the cache line 200, 260, respectively, is unused, as indicated in FIG. 3 by shading.

Note that, as compared to the prior art cache depicted in FIG. 1, the cache 22 of FIG. 3 stores only eight instructions in two cache lines, rather than nine. The word space corresponding to the length of I9—the halfwords at offsets 0x0A and 0x1E—is not utilized. This decrease in the efficiency of storing instructions in the cache 22 is the price of the simplicity, improved processor power, and lower power consumption of the cache utilization depicted in FIG. 3.

Additionally, by allocating a fixed number of variable length instructions to a cache line 200, 260, and aligning the instructions along predetermined boundaries, no instruction is stored misaligned across cache lines, such as I5 in FIG. 1. Thus, the performance penalty and excess power consumption caused by two cache 22 accesses to retrieve a single instruction are completely obviated.

Because a fixed number of variable length instructions is stored, rather than a variable number of instructions having a known total length (the length of the cache line), the address of the next sequential instruction cannot be ascertained by simply incrementing the tag 220 of one cache line 200 by the memory size of the cache line 200. Accordingly, in one embodiment, a next fetch address is calculated by the pre-decoder 21 when the instructions are aligned (prior to storing them in the I-cache 22), and the next fetch address is stored in a field 240 along with the cache line 200.

As an alternative to calculating and storing a next fetch address, according to one embodiment an offset from the tag 220 may be calculated, and stored in along with the cache line 200, such as in an offset field 240. The next fetch address may then be easily calculated by adding the offset to the tag address. This embodiment incurs the processing delay and power consumption of performing this addition each time a successive address fetch crosses a cache line. In other embodiments, other information may be stored to assist in the calculation of the next fetch address. For example, a set of bits equal to the fixed number of instructions in a cache line 240 may be stored, with e.g. a one indicating a fullword length instruction and a zero indicating a halfword length instruction stored in the corresponding instruction "slot." The addresses of the instructions in memory, and hence the address of the next sequential instruction, may then be calculated from this information. Those of skill in the art will readily recognize that additional next address calculation aids may be devised and stored to calculate the next instruction fetch address.

While various embodiments have been explicated herein with respect to a representative ISA including word and halfword instruction lengths, the present invention is not limited to these embodiments. In general, any variable length instructions may be advantageously stored in an instruction cache 22 in a fixed number, aligned along predetermined boundaries. Additionally, a different size cache line 240, 300 than that depicted herein may be utilized in the practice of various embodiments.

Although embodiments of the present invention have been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of cache management in a processor having variable instruction length, the method comprising:

storing a first plurality of instructions comprising a fixed number of instructions in a first cache line of a cache, the first plurality of instructions including a first instruction having a first instruction length and a second instruction having a second instruction length that differs from the first instruction length;

storing a second plurality of instructions comprising the fixed number of instructions in a second cache line of the cache; and storing in the cache and adjacent to the first cache line one of:
  a next fetch address; and
  an offset yielding the next fetch address when added to a cache line tag associated with the first cache line.

2. The method of claim 1, further comprising inspecting each of the first plurality of instructions to determine their corresponding lengths and aligning each of the first plurality of instructions along predetermined boundaries.

3. The method of claim 1, further comprising, prior to placing the first plurality of instructions in the first cache line, determining at least one of:
  the next fetch address; and
  the offset.

4. The method of claim 1, further comprising ascertaining a corresponding predetermined instruction boundary associated with each of the first plurality of instructions.

5. The method of claim 1, further comprising aligning each of the first plurality of instructions with a corresponding predetermined boundary of the first cache line.

6. The method of claim 5, wherein each predetermined boundary is a word boundary having an associated word address.

7. The method of claim 1, wherein after storing the fixed number of instructions, the first cache line includes an unoccupied portion.

8. The method of claim 1, wherein the fixed number is four.

9. A processor comprising:
  an instruction cache comprising:
    a first cache line to store a predetermined number of instructions including a first instruction and a second instruction, wherein the first instruction has a first instruction length and the second instruction has a second instruction length that differs from the first instruction length; and
    a second cache line to store the predetermined number of instructions;
  wherein the first cache line is further to store one of:
    a next fetch address; and
    an offset yielding the next fetch address when added to a cache line tag associated with the first cache line.

10. The processor of claim 9, further comprising a predecoder operative to align each of the first instruction and the second instruction with a corresponding predetermined boundary of the first cache line.

11. The processor of claim 10, wherein the predecoder is operative to calculate the next fetch address of a next instruction following a final instruction written to the first cache line, and to store in the first cache line one of the next fetch address of the next instruction and the offset.

12. The processor of claim 9, further comprising a predecoder operative to:
  ascertain a corresponding length of each instruction;
  align each instruction along a corresponding word boundary of the cache; and
  pass the aligned instructions to the cache.

13. The processor of claim 9, further comprising an instruction execution pipeline operative to execute instructions having varying lengths.

14. A method of cache management in a processor having variable instruction length, the method comprising:
  determining a fixed number of instructions storable per cache line of a cache comprising a plurality of cache lines, wherein the fixed number is greater than one; and
  storing a plurality of instructions including the fixed number of instructions in a first cache line, the plurality of instructions including a first instruction having a first instruction length and a second instruction having a second instruction length that differs from the first instruction length.

15. The method of claim 14, further comprising inspecting each of the plurality of instructions to determine a corresponding length of each instruction, and aligning each of the plurality of instructions along a corresponding predetermined boundary prior to placement in the cache.

16. The method of claim 14, wherein each of the plurality of instructions has a corresponding instruction length that does not exceed a word length associated with the first cache line.

17. The method of claim 15, wherein at least one predetermined boundary is a word boundary.

18. The method of claim 14, further comprising storing a next fetch address in the cache and adjacent to the first cache line.

19. The method of claim 18, further comprising determining the next fetch address prior to storing the plurality of instructions in the first cache line.

20. The method of claim 14, further comprising storing an offset in the cache and adjacent to the first cache line, the offset yielding a next fetch address when added to a cache line tag associated with the first cache line.

* * * * *